United States Patent
Shoemaker et al.

(10) Patent No.: US 7,885,902 B1
(45) Date of Patent: Feb. 8, 2011

(54) LEARNING-BASED RECOMMENDATION SYSTEM INCORPORATING COLLABORATIVE FILTERING AND FEEDBACK

(75) Inventors: Austin William Shoemaker, Stanford, CA (US); Hariraam Varun Ganapathi, Stanford, CA (US); David William Shoemaker, Sarasota, FL (US)

(73) Assignee: Soulsearch.com, Inc., Sarasota, FL (US)

( * ) Notice: Subject to any disclaimer, the term of this patent is extended or adjusted under 35 U.S.C. 154(b) by 3 days.

(21) Appl. No.: 11/399,899

(22) Filed: Apr. 7, 2006

(51) Int. Cl.
*G06Q 99/00* (2006.01)
(52) U.S. Cl. .................................. 705/319; 705/1.1
(58) Field of Classification Search ............... 705/1, 705/319, 1.1
See application file for complete search history.

(56) References Cited

U.S. PATENT DOCUMENTS

| | | | |
|---|---|---|---|
| 6,735,568 B1 * | 5/2004 | Buckwalter et al. ............. | 705/1 |
| 6,826,552 B1 * | 11/2004 | Grosser et al. ................. | 706/47 |
| 7,222,085 B2 * | 5/2007 | Stack ........................... | 705/10 |
| 2002/0040310 A1 * | 4/2002 | Lieben et al. .................. | 705/7 |
| 2002/0055870 A1 * | 5/2002 | Thomas ......................... | 705/10 |
| 2004/0044658 A1 * | 3/2004 | Crabtree et al. ................ | 707/3 |
| 2004/0210661 A1 * | 10/2004 | Thompson ................... | 709/228 |
| 2005/0278125 A1 * | 12/2005 | Harwood et al. .............. | 702/20 |
| 2006/0121990 A1 * | 6/2006 | O'Kelley et al. .............. | 463/42 |

OTHER PUBLICATIONS

"Written Opinion", Issue in PCT Application No. PCT/US2007/66164; Mailing Date.: Mar. 19, 2008.
"International Search Report", Issue in PCT Application No. PCT/US2007/66164; Mailing Date.: Mar. 19, 2008.
Taskar, et al., "Discriminative Probabilistic Models for Relational Data", Eighteenth Conference on Uncertainty in Artificial Intelligence, 8 pgs, (UAI02), Edmonton, Canada, (Relational Markov networks),(Aug. 2002).
Sinkkonen, et al., "Clustering Based on Conditional Distributions in an Auxiliary Space", Neural Computation, 23 pgs, Neural Computation 14, 2001 MA Institute of Technology,(2001),pp. 217-239.
Ng, et al., "On Spectral Clustering: Analysis and an algorithm", 8 pages, Advances in Neural Information Processing Systems (NIPS) 14.,(2002).
Shental, et al., "Computing Gaussian Mixture Models with EM using Side-Information", In workshop 'The Continuum from labeled to unlabeled data in machine learning and data mining' (with ICML-2003), 11 pages, https://eprints.kfupm.edu.sa/31447/1/31447.pdf, ICML-03, 11 pgs,(Aug. 2003).
Dobson, et al., "An Introduction to Generalized Linear Models", (2002) Boca Raton, FL, Chapman & Hall/CRC, Pages: entire book.
Raudys, Sarunas "Statistical and Neural Classifiers", (2001) London, U.K., Springer-Verlag London Limited, Pages: entire book.

(Continued)

*Primary Examiner*—Jonathan Ouellette
(74) *Attorney, Agent, or Firm*—IP Strategy Group, P.C.

(57) ABSTRACT

Computer-implemented methods for providing recommendations for a given user. The computer-implemented method employs some or all of machine learning, collaborative filtering, clustering, profile data from the given user, profile data from other users, feedback data from the given user from past interactions, and feedback data from other users from past interactions to more accurately provide recommendations to the given user.

22 Claims, 4 Drawing Sheets

OTHER PUBLICATIONS

Korb, et al., "Bayesian Artificial Intelligence", (2004) Boca Raton, FL, Chapman & Hall/CRC, Pages: entire book.
Vapnik, Vladimir N., "Statistical Learning Theory", (1998) New York, New York, Wiley-Interscience, Pages: entire book.
Dunteman, George H., "Principal Components Analysis", (1989) Newbury Park, CA, Sage Publications, Pages: entire book.
Hyvärinen, et al., "Independent Component Analysis", (2001) Hoboken, NJ: John Wiley & Sons, Pages: entire book.
"International Preliminary Report on Patentability", Issued in PCT Application No. PCT/US2007/066164; Mailing Date: Oct. 16, 2008.

* cited by examiner

LEARNING-BASED RECOMMENDATION SYSTEM INCORPORATING COLLABORATIVE FILTERING AND FEEDBACK

BACKGROUND OF THE INVENTION

In today's society, people make hundreds of choices daily. Some of these choices pertain to routine matters, the outcomes of which tend to be generally predictable. Examples of such choices include, for example, what to wear, what to eat, who to call, what time to come home from work, etc. Other choices may involve more uncertainty. In making these uncertain choices, a satisfactory outcome is rarely assured. Some of these uncertain choices may involve life-maintenance or work-related issues, such as purchasing decisions pertaining to the acquisition of goods or services, for example. Other uncertain choices may be highly personal: forming a team from a group of people, establishing a supervisor-subordinate pairing at work, or discovering a social, romantic, or marriage partner. In each of these choices, a satisfactory outcome is not always assured and failure may occur despite extensive preparation and/or research prior to making the decision.

Although the invention herein may apply to any situation in which choices need to be made when the outcome is not readily predictable in advance (i.e., uncertain choices), the dating example will be employed in this disclosure to facilitate discussion. In many ways, dating is a familiar and representative example of a series of uncertain choices. In the dating arena, a person seeking a date (referred to herein as the "date seeker") must make choices in selecting potential dates (whether for a short-term encounter or for a long-term relationship) based on imperfect and incomplete information, leading to high uncertainty in the outcome.

With respect to imperfect information, a date seeker usually has, for example, a self-perception about his looks, personality, and/or status, which may or may not reflect his objective qualifications and/or characteristics. Further, the date seeker may also have pre-conceived ideas about the characteristics of his perfect date. However, these pre-conceived ideas may or may not approximate the characteristics of the person who may in fact be a good match for that date seeker. Since dating choices are sometimes made based on flawed self-perception and/or inaccurate requirements for potential dates, the result tends to be highly uncertain and oftentimes unsatisfactory.

To help improve dating matches, many commercial services have sprung up over the years to assist date seekers in finding desirable matches. In the interne era, many of these services have become computerized and networked, and many have amassed a large database of candidates for fulfilling match requests made by date seekers.

In a typical arrangement, users sign up to be candidates for matches and to request matches with an internet-based dating service. A date seeking user is typically asked to input his personal information, including for example both his self-description and the perceived description of his ideal date. The user-inputted data is then employed to filter through the database of users to find potential match candidates. These potential candidates, typically representing a small percentage of the total number of users, are then presented to the date seeker for selection. Although some service may employ certain privacy protection techniques, the basic premise remains the same in that a date seeker is presented for selection, at some point in time, a list of potential candidates that has been filtered from the user database using data supplied by the date seeker.

Unfortunately, a date seeker's flawed self-perception and/or flawed pre-conceived ideas about his ideal date may adversely affect the accuracy of the filtering program that is typically employed to search the database. For example, a date seeker may honestly perceive himself as being athletic or as a social liberal person despite the fact that he may lead a sedentary lifestyle, objectively speaking, or may be extremely conservative on most social issues. As another example, a user may also honestly believe that he desires an outgoing, high-energy date when he may in fact be more at ease and happier when dating someone more relaxed and easy-going.

Some internet-based dating services attempt to improve on the filtering approach by employing trained professionals such as psychologists to prepare the set of questionnaires for users. These questions or "compatibility tests" are intended to solicit more truthful or relevant data from a date seeker regarding himself and his ideal match. The psychologists may also assist in formulating filtering programs to enable the database engine to select candidates with a higher probability for compatibility. However, the use of psychologists does not guarantee success since the questions and filtering programs may reflect the attitudes, preferences and values of the psychologists instead of the date seeking population. As a result, the data acquired may be less than relevant for compatibility matching purposes and/or the filtering programs may provide match candidates that may be biased toward high compatibility with the people who devise the filtering processes instead of selecting for compatibility between the date seekers themselves.

Further, even if psychologists could devise highly relevant questions and could come up with filtering strategies that result in more compatible recommendations, poor results are still possible if, as discussed, the date seeker's self-perception and/or the date seeker's pre-conceived ideas about his ideal dates are inaccurate. This is because contemporary dating services, both traditional and internet-based, tend to rely almost exclusively on the self-perception data and the ideal match description data provided by the date seeker in filtering through the database. In this case, although the system may be able to provide the date seeker with the candidates he thinks he wants, dissatisfaction may still result since the imagined personas of each candidate are likely more compatible than the people themselves.

SUMMARY OF INVENTION

The invention relates, in an embodiment, to a computer-implemented method for providing recommendations for a first user. The recommendations are selected from a plurality of possible choices. The computer-implemented method includes receiving first user profile data, the first user profile data including at least first user self-description data and first user perceived requirement data furnished by the first user. The computer-implemented method further includes providing a set of hypotheses, the set of hypotheses being obtained by applying machine learning to a training set comprising a plurality of input samples. Each of the plurality of input samples represents a past interaction and includes at least input sample user profile data, input sample characteristic data that characterizes a recommended match for the past interaction and an associated feedback satisfaction value for the past interaction. The computer-implemented method also includes applying the set of hypotheses against the first user profile data and at least a subset of the plurality of possible choices to obtain a set of match candidates. The computer-implemented method includes providing at least one of the match candidates to the first user as the recommendation.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
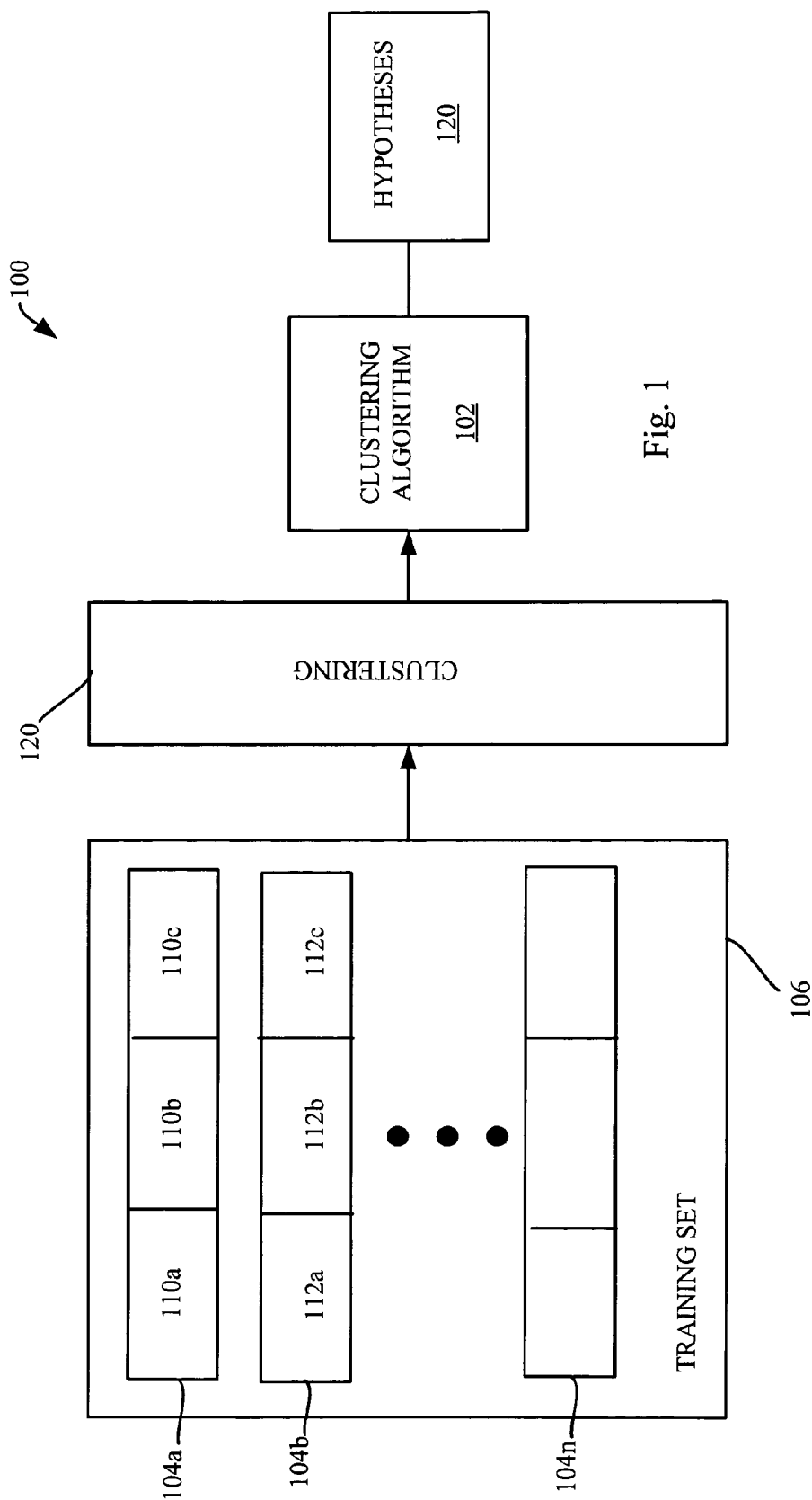
FIG. 1 shows an example a pre-processing back-end of the learning-based system.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Generally speaking, embodiments of the invention apply scientific analysis in the form of machine learning to real-world profile data from users and to feedback data from past user interactions in order to provide more satisfactory recommendations to individual users.

The invention relates, in an embodiment, to computer-implemented methods and apparatus for providing recommendations with a high satisfaction probability to assist humans in making choices. In embodiments of the invention, a learning-based approach is employed to select among possible choices the recommendations with the maximum likelihood of user satisfaction. In an embodiment, the learning-based approach takes into account not only the user's self-description and perceived requirements for ideal matches (i.e., profile data) but also the feedback data provided by the user after the interactions to enable the computer-implemented system to model the user's true behavior and improve the accuracy of the suggestions. In an embodiment, even the profile data and feedback data of other users are employed simultaneously by the learning-based approach to improve the recommendations.

An interaction, as the term is employed herein, refers to the activity that takes place when the user adopts one of the recommendations provided by the learning-based system. If the learning-based system is employed to provide recommendations regarding purchases, for example, the interaction may describe the user's experience with the purchased goods or service. If the learning-based system is employed in an internet-based dating service to provide recommendations regarding potential romantic dates, for example, the interaction may describe the date seeker's experience with the person recommended by the dating service.

Recommendation accuracy, as the term is employed herein, refers to the degree with which the learning-based system can provide recommendations that, if adopted by the user, result in a high level of satisfaction. A high level of accuracy indicates that the learning-based system is able to provide recommendations that, if adopted by the user, result in a high level of satisfaction. Generally speaking, even though satisfaction is relative and/or subjective, a user knows the difference between a satisfactory interaction and an unsatisfactory interaction and can provide feedback to reflect whether an interaction is satisfactory or unsatisfactory. Alternatively or additionally, the user can also provide feedback regarding the degree of satisfaction or dissatisfaction perceived (e.g., based on a numerical scale or some quantized scale).

In an embodiment, users of the learning-based system is initially asked to input their own self-description data, along with perceived requirements regarding the ideal match (e.g., characteristics of the desired item, service, person, etc.). The system then performs computer-implemented learning, using at least the profile data input by the user, to come up with recommendations. In an embodiment, user feedback is collected and correlated with the recommendations that generate the interactions that result in the feedback data. Over time, the user feedback is employed by the learning-based approach to improve the accuracy of the recommendations.

In this manner, the learning-based system is able to provide, either initially or over time, recommendations that result in a high level of satisfaction. Even if the user input data is flawed (i.e., the user has an erroneous perception of self or of the ideal match), his feedback from past interactions can provide the learning algorithm with data to improve the recommendations. The result is that the system can provide the user with recommendations that fit what the user really wants, even if those recommendations are at odds with what the user thinks he wants.

Alternatively or additionally, the self-description and perceived requirement data from other users, along with feedback data from other users from their past interactions, may be employed by the learning algorithm to improve the accuracy of the recommendations. In an embodiment, learning is performed on other users' profile data and feedback data to provide more accurate recommendations for a given user. Even if the given user has not had any of his own interactions and thus has provided no feedback data, this type of collaborative filtering (i.e., learning from other users' profile data and feedback data to provide more accurate recommendations to a particular user) renders the recommendations more accurate than would be possible using only the subjective input data provided by that given user. After the user has adopted some of the recommendations and experienced several interactions of his own, the resultant feedback data may also be employed by the learning process to refine future recommendations.

Generally speaking, the learning algorithm is trained by a set of input samples (known as the training set) to generate hypotheses. These hypotheses are then applied against the profile data of a particular user and the data pertaining to a candidate match to ascertain whether such a recommendation would likely be deemed satisfactory. The hypotheses may be applied iteratively against a plurality of candidate matches to ascertain the recommendations that would likely result in the highest satisfaction level. The recommendations deemed to be likely to result in the highest satisfaction level are then provided to the user for selection.

In an embodiment, clustering is employed on input samples to reduce the computation complexity for the learning algorithm. Since the learning algorithm operates on the set of input samples to come up with its hypothesis for making the recommendations, reducing the features (i.e., characteristics, attributes and/or stated requirements) in the set of input samples enables the learning algorithm to operate in a lower dimensional space and can dramatically reduce computational complexity and/or reduce noise in the input data.

To clarify, each input sample to the learning-based system includes at least the profile data provided by the user, along with characteristics of a match. As the term is employed herein, profile data refers to one or more of the user's self-description and the perceived requirements regarding the ideal or desired match. Each input sample also includes features of the match (which may represent for example the purchased item in the buying recommendation example or the date in the dating service example) and a satisfaction value (SV), indicating the degree of satisfaction reported by the user for the match. Thus, each input sample reflects data from an actual match that has been made in the past, and the feedback from that match.

In the example wherein the learning-based system is employed to provide purchase recommendations, an input sample to the learning-based system may include the user profile data, and the match (i.e., characteristics of a particular item that the user has actually purchased or tried out in the past), and a satisfaction value (i.e., the feedback data pertaining to user satisfaction with the purchased item). In the example wherein the learning-based system is employed to provide recommendations for potential dates, an input sample employed to train the learning algorithm may include the user profile data, the profile data of a person that has gone out on a date with that user, and the feedback data from the user and/or the date pertaining to the satisfaction level with the dating experience.

As mentioned, before a recommendation can be made, users are asked initially to enter their profile data and optionally the perceived requirements pertaining to desired matches. In a complex system, the profile data may include dozens, hundreds, or even thousands of attributes or characteristics, necessitating many questions to solicit the desired profile data. In the dating example, a user's profile data may include physical characteristics, taste in music, reading, attitudes pertaining to certain issues, etc. The user's profile data may also include perceived requirements for the ideal date, which may include many attributes and characteristics, necessitating many questions to solicit the perceived requirement data. The challenge is to efficiently obtain relevant self-description and perceived requirement data for the purpose of making accurate recommendations without subjecting the user to an unduly long and/or tedious initial data gathering process involving a large number of questions.

In an embodiment, clustering is employed to derive relevant characteristics or attributes that may be different from those inputted by past users. These features may then be employed to efficiently obtain from current and/or future users data that may be more relevant for use in the recommendation process. In the dating service example, if male users who describe themselves as vegetarian, bicyclists, and creative tend have very good interactions with females who describe themselves as non-smokers, thrifty and active in social causes, clustering may create a feature "X" to represent the former group and a feature "Y" that describes the latter group. Subsequently, if a new male user indicates that his ideal female date is someone who is active in social causes, the system may proceed to directly ask that male user if he is a vegetarian, a bicyclist and/or a creative person. In so doing, the system may be able to quickly gather feature data that is highly relevant in the recommendation process and bypass questions that may not be as relevant. Clustering may employ a hard clustering approach or a soft clustering approach. The process of clustering and utilizing the result to optimize the data collection process may be performed at any time to improve the recommendation accuracy for existing users or new users.

In an embodiment, users may be asked to propose, in response to recommendations made, features that may be used to further refine recommendations in the future. Suppose a recommendation for a date by the system is judged by the user to be unsatisfactory, either when the user reviews the data regarding the recommended person or after the user has actually gone out on a date with the recommended person. The user may be asked to propose one or more features (i.e., characteristics or attributes) that, if known by the system, would have made a difference in the recommendation.

For example, a person allergic to cats may propose a question designed to gather data regarding whether a potential match keeps cats as pets. The allergic person may also specify that for him and others like him, a match with a person keeping cats as pets would be highly unsatisfactory. The proposed question regarding cats may then be asked of other users to help increase the relevancy of the prospective date database. The cat feature may also be utilized by the learning algorithm to come up with recommendations that are more likely to be deemed satisfactory by a future date seeker who already indicated that he is allergic to cats. Furthermore, if during profiling, another user is identified to be highly compatible with the person who is allergic to cats, the system might directly ask the other user whether she keeps cats as pets in order to avoid incompatibilities prior to returning results.

These and other features and advantages of embodiments of the invention may be better understood with reference to the figures and discussions herein. In the discussions that follow, an internet-based dating service will be employed as an example for discussing embodiments and aspects of the invention. It should be understood, however, that the invention has broader applications to areas where a recommendation is needed to assist a user in deciding among uncertain choices.

Referring now to FIG. 1, there is shown a pre-processing back-end 100 of the learning-based system. Pre-processing back-end 100 represents the portion of the learning based system that is responsible for generating hypotheses regarding feature combinations that would likely result in compatible matches. Pre-processing back-end 100 includes a learning algorithm 102, representing the machine learning algorithm that operates on input samples 104a-104n of a training set 106.

As mentioned, each input sample (e.g., 104a) may include, as shown by reference number 110a, profile features pertaining to a user (e.g., self-description data such as height, hair color, education, political orientation, etc., along with perceived requirement data of an ideal match according to that user). Input sample 104a also includes, as shown by reference number 110b, features such as height, hair color education, political orientation of the person matched against the user associated with input sample 104a. Input sample 104a may also include a satisfaction or compatibility value 110c, representing the subjective feedback from the user of input sample 104a to the date that took place with the matched person. Analogously, input sample 104b includes features 112a, 112b, and satisfaction/compatibility value 112c.

Training set 106 preferably includes all or as much of the data pertaining to users of the dating service as possible. The large number of input samples in the training set helps improve the accuracy of the hypotheses generated by the learning algorithm. An optional clustering algorithm 120 is shown disposed between the raw input samples in training set 106 and learning algorithm 102. Optional clustering algorithm 120 represents the clustering algorithm that may optionally be employed to reduce the number of features in the input samples in order to reduce the computational complexity of the learning algorithm.

Irrespective of whether learning algorithm 102 operates on the raw input samples in training set 106 or on input samples whose features have been optimized by clustering algorithm 120, the result is a set of hypotheses 120. The set of hypotheses 120 may include hypotheses such as, for example "Boston men who drive foreign sedans and work in office jobs tend to be highly compatible with Boston women who enjoy classical music and teach elementary schools," or "college-educated women who spend at least fifteen minutes a day exercising, prefer reading to watching television, and travel overseas for vacation tend to be highly compatible with men who are first born, attend church regularly, and get news from internet sources." There may be any number of hypotheses, all of which are generated based at least in part on the training samples, which include feature data pertaining to the date seekers and their dates, as well as feedback data provided as part of post-date interviews.

The input samples to be inputted into clustering algorithm 120 or learning algorithm 102 preferably represent all available input samples in the system or may, in an embodiment, represent a relevant set of input samples that is a subset of all available input samples. For example, the input samples may be filtered by race, region, or sexual orientation if desired. In the former case, a larger set of hypotheses may be obtained, which may be employed as a universal set of hypotheses for all date seekers. In the latter case, human judgment may help create more accurate matches more quickly since the resulting hypotheses may be more tailored for a certain group of date seekers.

For example, if men from a hypothetical region ABC who have less than a high school education overwhelmingly tend to have disastrous dates with any women who do not come from region ABC, the use of all available input samples to derive the hypotheses may result in a few disastrous date feedback before the learning algorithm correctly deduce that men from region ABC with less than a high school education tend to be compatible only with women from region ABC. If such outcome is known in advance (e.g., from well-known and reputable social studies), personnel at the dating service may restrict the input samples to people from region ABC or provide prior probabilities on such combinations of features, which would result in a set of hypotheses more tailored to date seekers from region ABC, even in the absence of plentiful feedback data. When a male date seeker from region ABC wishes to receive a recommended match, the match recommendation may be more accurate even if such match recommendation is the first ever for any male date seeker from same region.

At any rate, the set of hypotheses 120 is then employed to correlate features of a date seeker with features of possible match candidates to ascertain the pairings that result in a high satisfaction value (i.e., pairings that are compatible). The possible match candidates having the highest satisfaction values are then provided to the date seeker for selection. Note that in this case, the hypotheses and resultant match recommendations are generated using feature data and feedback data from the dating service users who may have no relationship with the current date seeker. The learning algorithm in effect learns from past experience using as much relevant feature data and feedback data available to it as possible, and is able to provide a more accurate match recommendation even for a new data seeker who has never received a prior match recommendation from the dating service.

Of course, if the date seeker has been provided with match recommendations in the past and has provided feedback from previous match recommendations (irrespective whether those match recommendations were actually accepted by the date seeker and resulted in actual dates), the profile data and feedback data associated with previous match recommendations may be deemed highly relevant and may be given due weight as highly relevant input samples by the learning algorithm in deriving future match recommendations. Additionally or alternatively, the feedback data may be incorporated during probabilistic inference as contextual information or to determine prior probabilities of the model.

Figure 2:
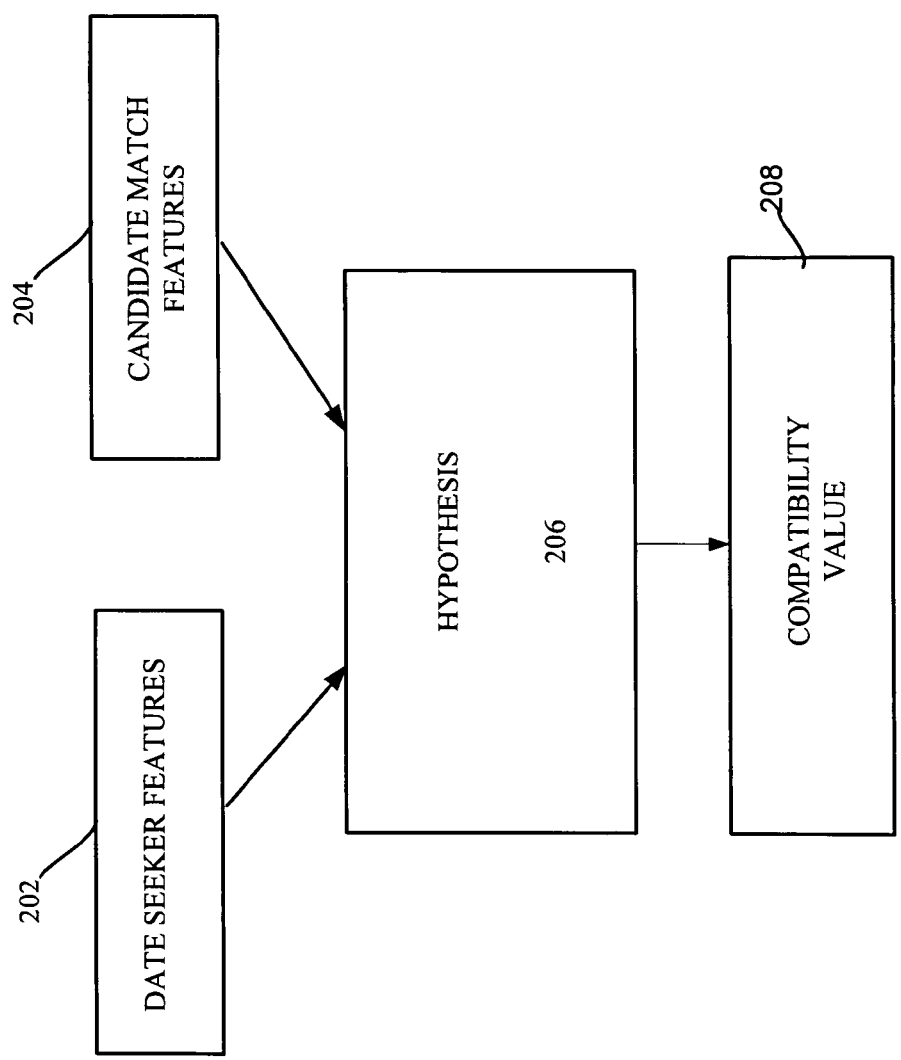
FIG. 2 shows an example application of the set of hypotheses to a given date seeker.

FIG. 2 shows the application of the set of hypotheses to a given date seeker. In FIG. 2, features of the date seeker 202 (i.e., characteristics, attributes and/or requirements of the date seeker as obtained/deduced via questions previously presented to the date seeker) and features of a candidate match person 204 (i.e., characteristics, attributes and/or requirements of the candidate match person as obtained/deduced via questions previously presented to the candidate match person) are employed as input data for the set of hypotheses 206. The result is a satisfaction value or compatibility value 208, predicting the likelihood that the proposed match recommendation would be deemed satisfactory or compatible by the two participants if they actually go out on a date.

The procedure of FIG. 2 may be executed iteratively, with different samples pairing the date seeker with different potential match candidates utilized as input data for the set of hypotheses 206 to ascertain the set of match candidates (e.g., top 3, top 5, etc.) having the highest predicted compatibility values. The person or persons with the highest predicted compatibility values may then be presented to the date seeker as match recommendation(s) by the dating service.

As can be appreciated from the foregoing, the recommendations are made based on actual feedback data, which are correlated with features from users who participated in the interactions that result in the feedback data and with features of the date seeker. Thus, even if the date seeker provides a flawed set of perceived requirements for his ideal match, the learning algorithm may be able to deduce from past feedback data the possible match persons who are likely to be compatible with the date seeker. For example, if a middle-aged rancher from Abilene, Tex., who enjoys playing chess and rock gardening, provides as his perceived requirements that his ideal match be a California surfer girl who are into sailing and yoga, the learning algorithm may derive from feature data and feedback data associated with the other users a set of hypotheses that, when applied against possible match persons, suggests that the more compatible match for the rancher may be a lady librarian from Dallas, Tex. who enjoys antique shows and classical music, or an accountant from Clovis, N. Mex. who prefers wine over beer and paints for relaxation.

In other words, the dating service constructed in accordance with embodiments of the invention applies scientific methodology to actual feature data and real-world feedback data to provide more accurate match recommendations (i.e., recommendations that are likely to result in compatible matches). In other words, the dating service is able to provide the date seeker with recommendations that are highly likely to result in truly compatible matches rather than recommendations based purely on what the date seeker may have perceived in advance (and possible erroneously) to be his ideal matches.

In an embodiment, if the date seeker insists on certain inflexible requirements (such as based on weight, looks, sexual orientation, religion, race, occupation, financial status, etc.), the learning algorithm and/or set of hypotheses can also accommodate by eliminating out right match candidates that do not meet the inflexible requirements. For all other features, the learning algorithm may be able to provide recommendations that are highly likely to result in compatible matches even if the recommended match person possesses attributes/characteristics different from those specified by the date seeker as attributes/characteristics of his desired date.

As discussed, a learning algorithm is employed in FIG. 1 to provide the set of hypotheses for use in providing recommendations. In an embodiment, an algorithm such as SVM (Support Vector Machine) is used as the learning algorithm. SVM is a well-known classification algorithm, the details of which may be readily obtained from publicly available literature. An example reference material that discusses SVM is The Nature of Statistical Learning Theory by Vapnik, V., Springer Verlag, New York (1995).

Figure 3:
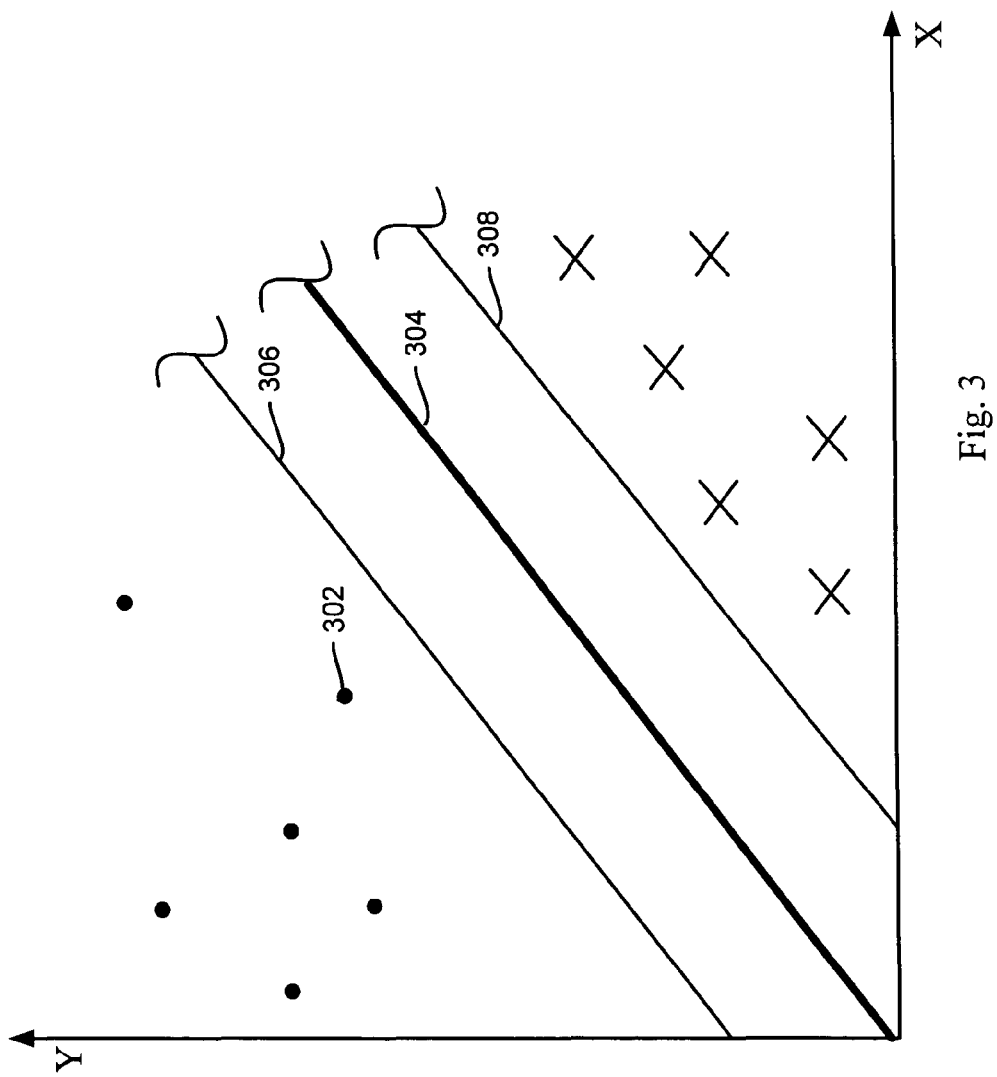
FIG. 3 shows an example simplified plot that is employed to illustrate the basic premise of a classification algorithm such as SVM.

FIG. 3 is a simplified plot employed to illustrate the basic premise of a classification algorithm such as SVM. To simplify the discussion, assume that each person registering with the dating service is required to answer only one question (i.e., one feature per person). For illustration purposes, suppose the question pertains to the age of the user. Thus, with only one feature per user, the classification problem in the example of FIG. 3 is a two-dimensional problem (2-dimensional space), with the answer by the first person of a pairing (i.e., an interaction between two users that resulted from a past recommendation) plotted along the X axis and the answer by the second person of the paring plotted along the Y axis. The feedback data (which is a label for classification purposes) from the interaction is also plotted in FIG. 3 as support vector data points in the graph (e.g., 302), with each support vector data point correlating with the respective answers provided by the two persons in the pairing in response to the question about their age. In the example of FIG. 3, the answers and feedback data come from the training samples employed to generate the hypotheses.

The classification algorithm then ascertains the boundary between compatible matches and incompatible matches, as reflected in the feedback data provided after the interactions and as plotted in FIG. 3. In the example of FIG. 3, each feedback data point below line 304 (representing the example boundary ascertained by the classification algorithm) is represented with an "X", signifying an incompatible match.

Each feedback data point above line 304 is represented with an "O", signifying a compatible match. The classification algorithm also ascertains the optimal margin as represented by lines 306 and 308, bracketing line 304. Lines 304, 306, and 308 may be viewed as the hypothesis correlating age with compatibility. By plotting the age of a date seeker against the age of a candidate match person, it is possible to determine whether the pairing would likely result in a compatible match.

The example of FIG. 3 has been deliberately simplified to facilitate discussion. It should be kept in mind, however, that SVM can readily be generalized to n-dimensional spaces to accommodate any number of features. Further, in the example of FIG. 2, the kernel employed is a linear kernel, resulting in a straight line 304. However, any kernel (e.g., polynomial, Gaussian RBF, etc.) may be employed, and line 304 may assume any arbitrary shape in any given n-dimensional space classification problem. Different kernels may yield different results, and the best kernel may be empirically determined for a given population of samples by cross-validation in view of the actual, real-world feedback data.

Figure 4:
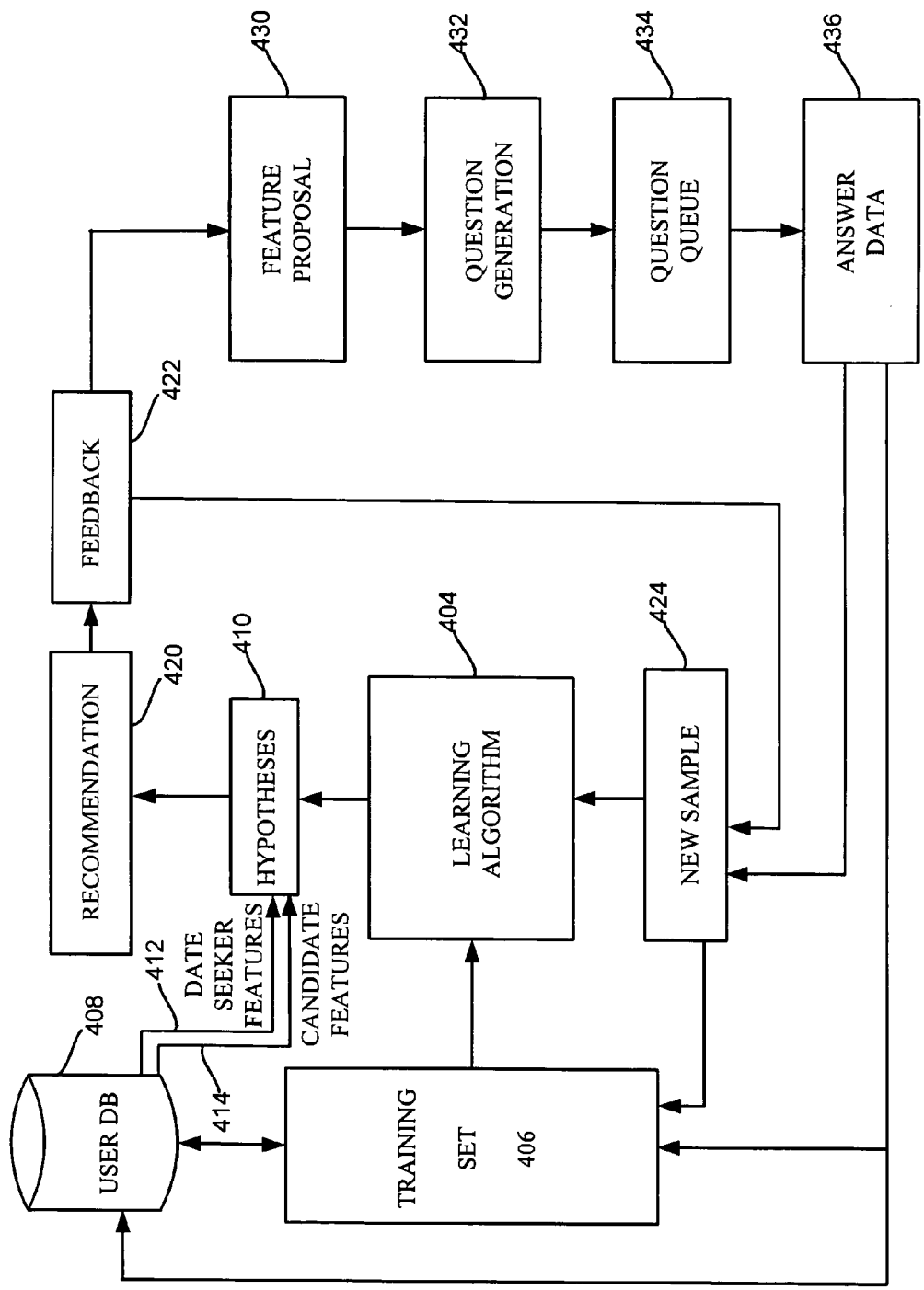
FIG. 4 shows, in accordance with an embodiment, component blocks of a learning-based dating recommendation system (LBDRS) for an internet-based dating service.

FIG. 4 shows, in accordance with an embodiment, component blocks of a learning-based dating recommendation system (LBDRS) 402 for an internet-based dating service. LBDRS 402 includes a learning algorithm 404, which takes as inputs a training set 406. As discussed, training set 406 may include input samples pertaining to all users of the dating service who have gone out on dates and who have provided feedback data. These input samples may be obtained from user database 408, for example. Learning algorithm 406, which may be for example SVM, produces a set of hypotheses 410, representing the hypotheses generated by LBDRS 402 regarding feature combinations which are likely to yield compatible matches.

Features 412 pertaining to a date seeker may then be employed as input into hypotheses 410. Features 414 pertaining to candidate match persons from user database 408 may be tested against features 412 of the date seeker using hypotheses 410 to derive a compatibility value. Candidate match person(s) having the highest compatibility values may then be provided as recommendation(s) 420 to the date seeker.

The date seeker may adopt one of the recommendations and go out on a date (i.e., undertake the interaction). After the interaction, the date seeker and/or his match may provide feedback 422, which indicates whether the match was compatible and may include a ranking of the degree of compatibility and/or satisfaction with the dating experience. The feedback data, along with features of the recommended date that resulted in the interaction, may then be formulated into an input sample 424 for use by learning algorithm 404 to update hypotheses 410 in order to refine future recommendations. In an embodiment, since input sample 424 represents the feedback from the date seeker himself, input sample 424 may be (but not required to be) given more weight by learning algorithm 404 than other input samples from other users. Further, input sample 424 may be stored in user database 408 as well as made part of training set 406 for future use.

In an embodiment, the date seeker and his match may be asked, as part of the feedback process 422, to propose other features 430. For example, the date seeker may be asked "what attribute or characteristic of a match person, if you could have asked in advance, would have been important for you to know?" For example, a person who identified himself as an ardent animal rights activist may propose that knowledge regarding whether his date is a vegetarian would have been important to know in advance. This proposed feature 430 is then employed to generate (432) a question or questions designed to ascertain the feature from the person to whom the question is posed. The question is then put into question queue or question database 434 for use to determine whether a candidate match is likely to be compatible with this user in the future or with other users who identified themselves as ardent animal rights supporter. The answer (436) to the question pertaining to the proposed feature by users may then be incorporated into training set 406 and/or input sample 424 for use by learning algorithm 404 in refining hypotheses 410.

In an embodiment, the question pertaining to the proposed feature may be posed to all users of the dating service. In an embodiment, the question pertaining to the proposed feature may be posed to users who have a similar profile (as determined by some feature selection algorithm using known feature selection techniques) and who have given feedback to their interactions to validate the correlation between the proposed feature and the degree of compatibility as furnished by past feedback data. For example, if 88% of animal rights activists (animal right activism being a feature identified by a feature selection algorithm to be correlating with the proposed feature of vegetarianism) provide satisfactory dates with vegetarians but only 7% of animal rights activists report compatible matches with non-vegetarians, the learning algorithm may determine that there is a high degree of correlation between vegetarianism and compatibility for matches with animal rights supporters. In an embodiment, the question pertaining to the proposed feature may be posed to candidate match persons who have been identified as possible suitable candidates for an animal-rights supporting date seeker.

As can be appreciated from the foregoing, embodiments of the invention apply scientific analysis to real-world profile data from users and feedback data from past interactions in order to improve match recommendations. The invention is learning-based, capable of continually improving its hypotheses and thus its recommendations based on accumulated profile data and feedback data. This is fundamentally different from approaches that rely on a static set of hypotheses, typically based on guesses made by humans, about the types of people who make compatible dates.

By incorporating the date seeker's past feedback data to refine the hypotheses and thus the recommendations, embodiments of the invention are capable of providing recommendations that are highly likely to be satisfactory even if the date seeker provided a flawed set of requirements for his ideal matches. In other words, date seekers are provided with match recommendations that are likely to be compatible, rather than with match recommendations based on the date seeker's stated requirements, which may or may not result in true compatibility. In this manner, the date seeker's feedback data is leveraged to provide highly accurate recommendations to that date seeker.

Furthermore, collaborative filtering leverages on profile data and feedback data from all users to improve the accuracy of the recommendations for a specific user, even if that specific user has never been on a date and has never given feedback. In other words, embodiments of the invention are capable of providing a date seeker new to the dating service with match recommendations that are likely to be compatible based on the profile data and feedback data of other users, rather than with match recommendations based on the date seeker's possibly flawed stated requirements. Of course if the date seeker has actually gone on dates and has provided his own feedback data, the learning algorithm would accord due weight to the data associated with the date seeker and revise its hypotheses accordingly to provide even more accurate recommendations in the future. This is also fundamentally distinct from matchmaking approaches that do not leverage the profile data of other users and/or feedback data from other users in making recommendations to a particular date seeker.

Furthermore, embodiments of the invention can generate new features via clustering to optimize the profile data collection process and/or to simplify the computational task for the learning algorithm. More accurate recommendations may also be obtained when users propose features as part of their feedback process, which proposed features are then turned into questions to be posed to future date seekers and/or match candidates to refine the recommendations. As such, embodiments of the invention leverage on the output of the clustering algorithm and/or feedback/input by the participants of the dating service themselves to improve or optimize the list of questions to be asked. As the questions become more relevant over time, the responses to these questions form a database of relevant features that are continually improving, enabling the hypotheses, which are applied against the features and feedback data, to make increasingly accurate recommendations. Furthermore, features that are deemed irrelevant to compatibility (e.g., those that are never or rarely part of a hypothesis) may be discarded over time, advantageously reducing the amount of time required to collect feature data from new users.

As mentioned, embodiments of the invention are computer-implemented, preferably as components of a computerized dating service that may be offered to users of a network such as the internet or a cellular telephone network. Software programs implementing the learning-based dating recommendation system (LBDRS) may be executed on a server or servers, and users may access the server or servers using a computing device (such as a laptop computer, a desktop computer, a palm-top computer, a suitable telephone or digital assistant device, etc.) via the network to register themselves, answer questions regarding the user's own profile, request match recommendations, make a selection from the recommendations, and/or provide feedback data after the date. Access to the dating service may take place using known networking techniques, such as via a browser or some suitable user interface, for example.

Although the examples herein employ SVM as the learning algorithm, other suitable learning algorithms may also be employed. For example, any max-margin classifier may be employed. As other examples, other suitable learning algorithms may be involved in various role in an embodiment, including but not limited to generalized linear models, perceptrons, probabilistic graphical models (e.g. Bayesian networks, relational Markov networks, etc.), expectation-maximization (EM), maximum-likelihood estimation, and discriminative clustering. These and others may be found in the references below, all of which are incorporated by reference herein.

Dobson, Annette J. *An introduction to generalized linear models*. Boca Raton, Fla.: Chapman & Hall/CRC, 2002.

Raudys, Sarunas. *Statistical and Neural Classifiers*. London, U.K.: Springer-Varlag London Limited, 2001. (max-margin classifiers and perceptrons)

Korb, Kevin B.; Nicholson, Ann E. *Bayesian Artificial Intelligence*. Boca Raton, Fla.: Chapman & Hall/CRC, 2004. (probabilistic graphical models, expectation-maximization)

Vladimir N. Vapnik. Statistical Learning Theory. New York, N.Y., Wiley-Interscience, 1998.

Taskar, Ben; Abbeel, Pieter; Koller, Daphne. "Discriminative Probabilistic Models for Relational Data." Eighteenth Conference on Uncertainty in Artificial Intelligence (UAI02), Edmonton, Canada, August 2002. (Relational Markov networks)

Janne Sinkkonen and Samuel Kaski. Clustering based on conditional distributions in an auxiliary space. Neural Computation, 14:217-239, 2002. (Discriminative Clustering)

Further, although the examples herein employ a generalized clustering algorithm, any suitable clustering algorithm may be employed. For example, other suitable clustering algorithms such as k-means, expectation-maximization, Gaussian mixture models, spectral clustering, Principal Components Analysis (PCA), and/or Independent Component Analysis (ICA) may be employed. These and others may be found in the references below, all of which are incorporated by reference herein.

Hartigan, J. A. and Wong, M. A. (1979). A k-means clustering algorithm. Applied Statistics 28, 100-108.

On spectral clustering: Analysis and an algorithm. A. Y. Ng, M. I. Jordan, and Y. Weiss. In T. Dietterich, S. Becker and Z. Ghahramani (Eds.), Advances in Neural Information Processing Systems (NIPS) 14, 2002.

Dunteman, George H. *Principal Components Analysis*. Newbury Park, Calif.: SAGE Publications, 1989.

N. Shental, A. B. Hillel, T. Hertz, D. Weinshall, "Computing Gaussian Mixture Models with EM using Side-Information", in Proc. of Int. Conference on Machine Learning, ICML-03, Washington D.C., August 2003.

Hyvärinen, Aapo; Karhunen, Juha; Oja, Erkki. *Independent Component Analysis*. Hoboken, N.J.: John Wiley & Sons, 2001.

These learning and/or clustering algorithms are well-known to those skilled in the art, and commercial software implementing at least some of these algorithms may be purchased.

Although embodiments of the invention can be advantageously applied to the matchmaking or dating service industry, it is contemplated that embodiments of the invention may apply broadly to any situation wherein computer-generated recommendations to a human are desired to improve the likelihood of a satisfactory outcome. For example, the learning-based recommendation system incorporating collaborative filtering and feedback may be employed to make recommendations regarding the purchase of goods and/or services. In this case, the match is between attributes of a person or organization (i.e., the purchaser) and attributes of goods or services, with the satisfaction level reported in the feedback representing the label for classification.

A highly advantageous application of embodiments of the invention may be in the area of recommendations for internet purchases of goods and/or services. For example, a buyer looking for a bicycle may input his profile (e.g., age, years of riding, type of riding, number of miles ridden per week, etc.) and optionally features of his desired matches (e.g., height of seat, type of tires, type of frame, suspension options, etc.) and the learning-based recommendation system may be able to make an accurate recommendation based on his profile data, the profile data of other users and their reported level of satisfaction with the bicycles they have ridden or purchased. If the user tries out bicycles and report his level of satisfaction with bicycles he has tried out, the learning-based system is able to use this feedback data as well to improve its hypotheses about the likelihood of user satisfaction with bicycles having particular features.

As a service purchase example, a buyer of cellular phone service may be able to input his profile (e.g., number of minutes called per month, number of long-distance minutes, number of local call minutes, preference for day time versus night time versus weekend calling, location of work, location of home, etc.) and optionally his desired matches (e.g., budget, number of minutes offered per month, number of long-distance minutes offered, number of local call minutes offered, roaming plan preference, type of phone preference, etc.). The learning-based recommendation system incorporating collaborative filtering and feedback may be employed to make recommendations regarding suitable calling plans that are currently being offered. As another example, a vacation seeker may employ a learning-based recommendation system incorporating collaborative filtering and feedback to receive recommendations regarding vacation spots, hotel recommendations, flight recommendations, and/or car rental recommendations based on his own profile data, the profile data of other vacationers and their feedback regarding vacations taken in the past.

The learning-based recommendation system incorporating collaborative filtering and feedback may also be employed in making other types of recommendations that do not necessarily involve a purchase, such as recommending compatible people to form a work group, a mentor-mentee relationship, an investor-entrepreneur relationship, etc. Thus, applications for embodiments of the invention may be found in any area where an accurate recommendation that is at least partially computer-generated is desired.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for providing recommendations for at least a first user, said recommendations being selected from a plurality of possible choices, the computer-implemented method comprising:

receiving first user profile data, said first user profile data including at least first user self-description data and first user perceived requirement data furnished by said first user;

providing or bypassing a first set of questions based on at least said first user perceived requirement data;

providing a second set of questions based on at least said first user perceived requirement data to said first user for collecting further first user self-description data;

providing a set of hypotheses, said set of hypotheses being obtained by applying machine learning to a training set comprising a plurality of input samples, each of said plurality of input samples representing a past interaction and including at least input sample user profile data, input sample characteristic data that characterizes a recommended match for said past interaction, and an associated feedback satisfaction value for said past interaction;

applying said set of hypotheses against said first user profile data and at least a subset of said plurality of possible choices to obtain a set of match candidates, said set of match candidates including at least a first match candidate and a second match candidate;

providing data regarding at least said first match candidate to said first user as a recommendation;

after said first match candidate has been judged by said first user to be unsatisfactory, requesting said first user to propose one or more features that would have made a difference in said recommendation;

after said requesting, receiving a user-proposed question from said first user, said user-proposed question being designed to gather data pertaining to said one or more features; and providing said user-proposed question to said second match candidate to collect additional data associated with said second match candidate pertaining to said one or more features prior to providing data regarding said second match candidate to said first user.

2. The computer-implemented method of claim 1 wherein said input sample user profile data is associated with a user other than said first user.

3. The computer-implemented method of claim 1 wherein said input sample user profile data represents said first user profile data.

4. The computer-implemented method of claim 1 wherein said machine learning employs a classification algorithm to derive said set of hypotheses.

5. The computer-implemented method of claim 4 wherein said classification algorithm represents a Support Vector Machine (SVM) algorithm.

6. The computer-implemented method of claim 1 wherein said plurality of input samples represents output data from a clustering algorithm.

7. The computer-implemented method of claim 1 further comprising utilizing said one or more features in a learning algorithm related to said machine learning.

8. The computer-implemented method of claim 1 further comprising:
receiving a proposed feature from said first user after an interaction that occurs responsive to said recommendation is completed; and
employing said proposed feature to refine user profile data of at least one other user that utilizes said computer-implemented method to obtain recommendations.

9. The computer-implemented method of claim 1 wherein said recommendation is a purchase recommendation for recommending said first user to purchase at least a set of recommended goods, said first user perceived requirement data characterizes goods desired by said first user.

10. The computer-implemented method of claim 1 wherein said recommendation is a buying recommendation for recommending said first user to purchase one or more recommended services, said first user perceived requirement data characterizes at least a service desired by said first user.

11. A device for providing recommendations for at least a first user, said recommendations being selected from a plurality of possible choices, the device comprising:
a program storage medium for storing computer readable code, the computer readable code including at least:
logic for receiving first user profile data, said first user profile data including at least first user self-description data and first user perceived requirement data furnished by said first user,
logic for providing or bypassing a first set of questions based on at least said first user perceived requirement data,
logic for providing a second set of questions based on at least said first user perceived requirement data to said first user for collecting further first user self-description data,
logic for providing a set of hypotheses, said set of hypotheses being obtained by applying machine learning to a training set comprising a plurality of input samples, each of said plurality of input samples representing a past interaction and including at least input sample user profile data, input sample characteristic data that characterizes a recommended match for said past interaction, and an associated feedback satisfaction value for said past interaction,
logic for applying said set of hypotheses against said first user profile data and at least a subset of said plurality of possible choices to obtain a set of match candidates, said set of match candidates including at least a first match candidate and a second match candidate,
logic for providing data regarding at least said first match candidate to said first user as a recommendation,
logic for requesting, after said first match candidate has been judged by said first user to be unsatisfactory, said first user to propose one or more features that would have made a difference in said recommendation;
logic for receiving, after said requesting, a user-proposed question from said first user, said user-proposed question being designed to gather data pertaining to said one or more features, and
logic for providing said user-proposed question to said second match candidate to collect additional data associated with said second match candidate pertaining to said one or more features prior to providing data regarding said second match candidate to said first user; and
circuits for performing tasks pertaining to said computer readable code.

12. The device of claim 11 wherein said input sample user profile data is associated with a user other than said first user.

13. The device of claim 11 wherein said input sample user profile data represents said first user profile data.

14. The device of claim 11 wherein said machine learning employs a classification algorithm to derive said set of hypotheses.

15. The device of claim 14 wherein said classification algorithm represents a Support Vector Machine (SVM) algorithm.

16. The device of claim 11 wherein said plurality of input samples represents output data from a clustering algorithm.

17. The device of claim 11 wherein said computer readable code further including at least logic for utilizing said one or more features in a learning algorithm related to said machine learning.

18. The device of claim 11 wherein said computer readable code further including at least:
logic for receiving a proposed feature from said first user after an interaction that occurs responsive to said recommendation is completed, and
logic for refining user profile data, using said proposed feature, of at least one other user that executes said computer readable code on said program storage medium to obtain recommendations.

19. A computer-implemented method for enabling an internet-based match-making service to provide a set of match recommendations for at least a first user said set of match recommendations pertaining to candidate matches selected by said computer-implemented method from a pool of potential matches, said pool of potential matches and said first user represent registered users who registered with said match-making service, the computer-implemented method comprising:
retrieving first user profile data associated with a first plurality of registered users of said match-making service, said first user profile data including at least first user self-description data furnished by said first plurality of registered users;

providing or bypassing a first set of questions based on at least first user perceived requirement data provided by said first user;

providing a second set of questions based on at least said first user perceived requirement data to said first user for collecting further first user self-description data;

retrieving second user profile data associated with a second plurality of registered users of said match-making service, said second user profile data including at least second user self-description data furnished by said second plurality of registered users, each of said second plurality of registered users represent a user who has experienced at least one interaction with at least one of said first plurality of registered user;

retrieving a plurality of feedback satisfaction values, each feedback satisfaction value of said set of feedback satisfaction values being associated with an interaction between of one of said first plurality of registered users and one of said second plurality of registered users;

applying a machine learning algorithm to process said first user profile data, said second use profile data, and said plurality of feedback satisfaction values to obtain a set of hypotheses;

applying said set of hypotheses against profile data associated with said first user and profile data associated with at least a subset of said pool of potential dates to obtain a set of candidates, said set of candidates including at least a first match candidate and a second match candidate;

providing data regarding at least said first candidate to said first user as a match recommendation;

after said first match candidate has been judged by said first user to be unsatisfactory, requesting said first user to propose one or more features that would have made a difference in said match recommendation;

after said requesting, receiving a user-proposed question from said first user, said user-proposed question being designed to gather data pertaining to said one or more features; and providing said user-proposed question to said second match candidate to collect additional data associated with said second match candidate pertaining to said one or more features prior to providing data regarding said second match candidate to said first user.

20. The computer-implemented method of claim 19 wherein said second plurality of users include said first user.

21. The computer-implemented method of claim 19 wherein said plurality of feedback values include a feedback value provided by said first user for an interaction experienced in the past by said first user.

22. The computer-implemented method of claim 19 further comprising:

receiving a proposed feature from said first user after an interaction that occurs responsive to said match recommendation is completed; and employing said proposed feature to refine user profile data of at least one other user that utilizes said computer-implemented method to obtain match recommendations for said at least one other user.

* * * * *